United States Patent [19]

Rivron et al.

[11] Patent Number: 5,375,793
[45] Date of Patent: Dec. 27, 1994

[54] PROCESS FOR THE CONTROL OF THE CONTROL SURFACES OF AN AIRCRAFT FOR THE LOW SPEED COMPENSATION OF A LATERAL PATH DEVIATION

[75] Inventors: Vincent Rivron; Cécile Vollard, Toulouse, both of France

[73] Assignee: Aerospatiale Societe Nationale Industrielle, Paris, France

[21] Appl. No.: 105,498

[22] Filed: Aug. 11, 1993

[30] Foreign Application Priority Data

Aug. 14, 1992 [FR] France ................... 9210038

[51] Int. Cl.⁵ ............... B64C 13/00; B64C 13/16
[52] U.S. Cl. ................ 244/75 R; 244/76 C; 244/184; 244/90 R
[58] Field of Search .......... 244/75 R, 76 C, 181, 244/184, 185, 186, 87, 90 R, 90 A, 90 B

[56] References Cited

U.S. PATENT DOCUMENTS

| | | | |
|---|---|---|---|
| 4,146,200 | 5/1979 | Borzachillo | 244/75 R |
| 4,479,620 | 10/1984 | Rogers et al. | 244/90 R |
| 4,729,528 | 3/1988 | Borzachillo | 244/90 R |
| 4,796,192 | 1/1989 | Lewis | 244/75 R |
| 4,935,682 | 6/1990 | McCuen | 244/76 J |
| 5,094,441 | 3/1992 | Rao | 244/90 R |
| 5,112,009 | 5/1992 | Farineau | 244/181 |
| 5,186,416 | 2/1993 | Fabre et al. | 244/75 R |

FOREIGN PATENT DOCUMENTS

| | | | |
|---|---|---|---|
| 4-66394 | 3/1992 | Japan | 244/75 R |
| 2192598 | 1/1988 | United Kingdom | 244/75 R |

Primary Examiner—Michael S. Huppert
Assistant Examiner—Virna Lissi Ansley
Attorney, Agent, or Firm—Michael N. Meller

[57] ABSTRACT

The present invention relates to a process for the automatic control of the control surfaces of an aircraft for the low speed compensation of a lateral path deviation, in which beyond a given deflection threshold (20) of the deflected rudder (17), there is a control of a deflection, proportional to the exceeding of the threshold, of the wing surfaces (13, 14) of one of the two wings (18), said wing being that on the side of the deflected rudder (17), so as to provide a drag supplement to said wing and therefore yaw on the aircraft.

Application to the take-off of large civil transport aircraft.

6 Claims, 2 Drawing Sheets

PROCESS FOR THE CONTROL OF THE CONTROL SURFACES OF AN AIRCRAFT FOR THE LOW SPEED COMPENSATION OF A LATERAL PATH DEVIATION

TECHNICAL FIELD

The present invention relates to a process for the control of the control surfaces of an aircraft for the low speed compensation of a lateral path deviation.

PRIOR ART

The certification regulations of large multiengine transport aircraft make it necessary to take into consideration the possibility of engine trouble occurring on the ground during take-off, followed by the continuation of aircraft taxying to the intended rotation speed and then take-off. The lateral deviation of the path during this phase must not exceed a limit.

In order to counter the yaw torque resulting from engine trouble, the pilot has his primary flight controls and in particular the rudder, which he deflects with the aid of the rudder bar. If the yaw torque is high, said deflection can reach the physical travel stop of the rudder and there is a minimum speed below which the lateral deviation, during the continuation of take-off, cannot be limited to the specified values. Any engine trouble occurring at a speed lower than this must necessarily lead to the abandonment of take-off.

The higher said minimum speed, the longer the minimum runway required for authorizing aircraft take-off at a given weight or, which is the same thing, the lower will be the take-off weight for an available runway length.

At present, the control surfaces present on the flying surfaces or wing areas are controlled by the pilot with the aid of the joy-stick or control wheel. The use of these surfaces during the critical take-off phase can only result from an action of the pilot on his joy-stick or control wheel in accordance with the roll axis. This action is only justified if, as a result of a failure, the aircraft has a tendency to leave the zero lateral roll attitude. This tendency does not exist in numerous aircraft and consequently the only action of the pilot taken into consideration for determining the lateral path deviation during engine trouble on take-off is the application of the maximum deflection of the rudder.

The process of the invention is to improve the behaviour of an aircraft equipped with fly by wire in the presence of such an asymmetrical situation, whose cause can be within the aircraft (failure of an engine, transportation of external loads, etc.) or can be outside the aircraft (cross wind, partly flooded runway, etc.).

DESCRIPTION OF THE INVENTION

The present invention proposes a process for the automatic control of the control surfaces of an aircraft for the low speed compensation of a lateral path deviation, characterized in that beyond a given deflection threshold of the rudder, a deflection, proportional to the exceeding of the threshold of the wing surfaces of one of the two wings is controlled, said wing being that on the side of the deflected rudder, so as to supply a drag supplement to said wing and therefore yaw torque to the aircraft.

It is therefore possible to control a deflection of at least one aileron of the wing on the side of the deflected rudder. Advantageously, if said wing has two ailerons, a differential deflection of the ailerons of the wing in question is controlled, one being deflected downwards and the other upwards, so as to minimize the roll torque.

Advantageously, it is also possible to upwardly deflect at least one spoiler on the wing on the side of the deflected rudder by a quantity such that the roll torque created by all the deflected control surfaces is minimized. In general terms, it is possible to control any wing surface, whose deflection can vary the drag difference between the two wings in the desired sense.

As a result of the process according to the invention, during the take-off phase with engine trouble or cross wind, the yaw efficiency of the aerodynamic control surfaces of the aircraft is increased when the pilot applies the full deflection of the rudder and this occurs without any other action on the part of the pilot. Thus, it is possible to reduce the lateral deviation or, as a result thereof, reduce the minimum speed below which the deviation becomes excessive and take-off must be abandoned. Thus, under certain conditions, there is an increase in the take-off weight on a given runway.

Moreover, said yaw efficiency increase is accompanied by a minimizing of the indirect and undesirable effects on the roll axis induced by the deflection of the rudder bar.

The process according to the invention can be applied to all cases of asymmetry (engine failure on take-off, cross wind, etc.) liable to be encountered at low speed, both on the ground and in flight.

GENERAL PRINCIPLES

The movements of an aircraft in flight are obtained by the manipulation of a certain number of mobile or control surfaces, which are themselves controlled by the flying or piloting members made available to the pilot, namely a joy-stick (pitch or roll axes) and pedals (or rudder bar for the yaw axis).

Figure 1:
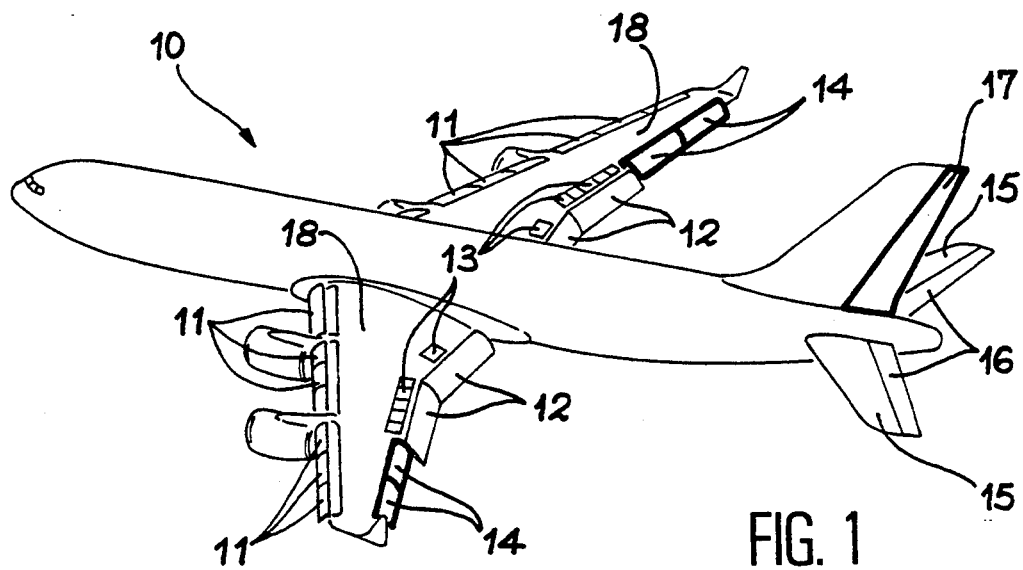
FIG. 1 illustrates the position of an aircraft control surfaces.

As shown in FIG. 1, in the case of aircraft 10 of the airbus type, these are:

1. On the wing surface, where the control surfaces are most numerous:
    a series of slats 11 at the front,
    a series of flaps 12 at the rear, opened out on take-off and landing to bring about a hyperlift,
    a series of spoilers 13 (on the wing upper surface), with three relatively different and/or complimentary functions having a symmetrical movement like an airbrake in flight or a tilter when taxying on landing, or asymmetrical assisting the ailerons,
    two ailerons 14 per wing, for a differential deflection between the left and right wings, the internal ailerons being effective throughout the flight and being assisted by the external ailerons at low speed.

2. For the rear tail units, the active surfaces are:

a regulatable horizontal plane 15, which makes it possible to adjust the balance of the aircraft in pitch, as a function of the speed and position of its centre of gravity (essentially variable according to the initial loading on the ground and in flight according to the progressive emptying of the tanks—symmetrical operation), the elevators 16, dependent on the preceding unit, permitting piloting in the vertical plane in pitch (symmetrical operation), the rudder 17 used for controlling the yaw of the aircraft.

DETAILED DESCRIPTION OF EMBODIMENTS

The age of mechanical or mechano-hydraulic controls has passed for large civil carriers and modern aircraft are of the fly by wire type. The latter offers numerous advantages such as weight, reliability, safety, mixing of controls, etc.

In the process of the invention, use is made of fly by wire for detecting a significant deflection of the rudder bar and for controlling automatically as a consequence thereof and even if the joy-stick or control wheel is not deflected in roll, a deflection of the wing surfaces for producing an increase in drag on a single wing. This leads to a yaw torque which is added to that brought about by the rudder controlled by the rudder bet.

Figure 2:
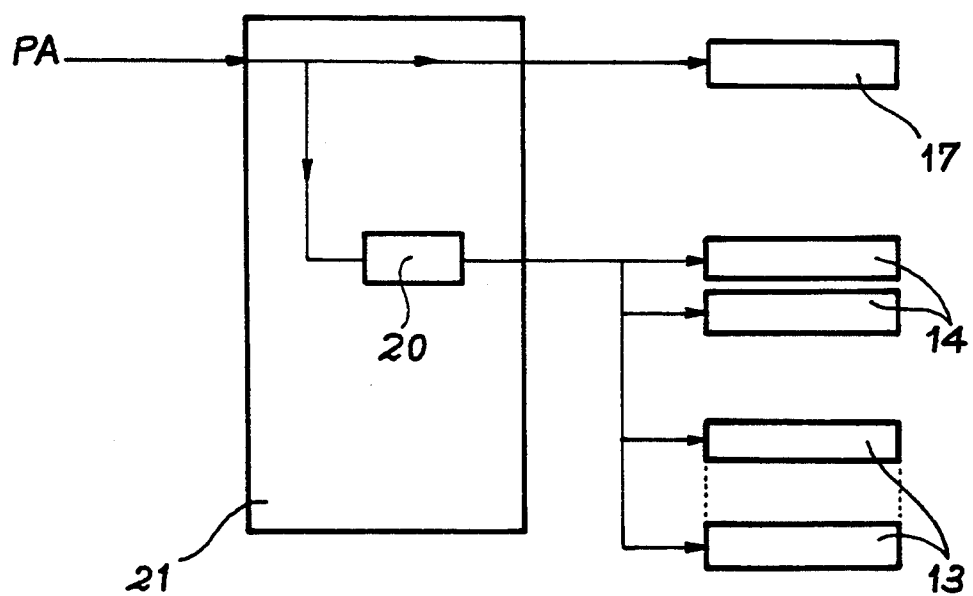
FIG. 2 diagrammatically illustrates the control of the control surfaces of a wing as a result of the process according to the invention.

According to the process of the invention and as shown in FIG. 2, e.g. when the aircraft is on the ground in the take-off phase, it is found that the rudder bar PA requires a deflection of the rudder 17 close to the stop or abutment. Beyond a certain threshold S, under the control of a computer 21, there is a deflection of the roll surfaces of one wing 18, so as to increase drag on the latter. This deflection is proportional to the exceeding of a threshold 20 and is added to that resulting from the roll control.

When each wing is provided with two ailerons 14, as shown in FIG. 1, one is deflected upwards and the other downwards, so as to minimize the roll torque. In the same way, for increasing the yaw torque, one or more spoilers 13 can be deflected upwards on said same wing by a quantity such that the roll torque created by all the deflected surfaces (ailerons, control surfaces, spoilers) is minimized.

Thus, in the process of the invention, a new notion is introduced of differential deflection of two ailerons of the seine wing from the side of the deflected rudder (without modifying the situation of the opposite wing), in order to generate in this way a drag supplement making it possible to obtain the desired yaw torque.

Moreover, the overall effect in accordance with the roll axis of the thus deflected aerodynamic control surfaces, including the rudder, is carefully metered in such a way as to minimize undesired effects.

In more general terms, the process according to the invention is applicable to an aircraft, whose wings only have the standard one and not two ailerons on each side. In order to apply the present process, in this case use will be made of the deflection of the combination of spoilers and the single aileron for achieving the sought aim.

For the remainder of the description and as a non-limitative example, consideration will be given to the use of the process according to the invention in an aircraft having a configuration like the Airbus A340.

Figure 3:
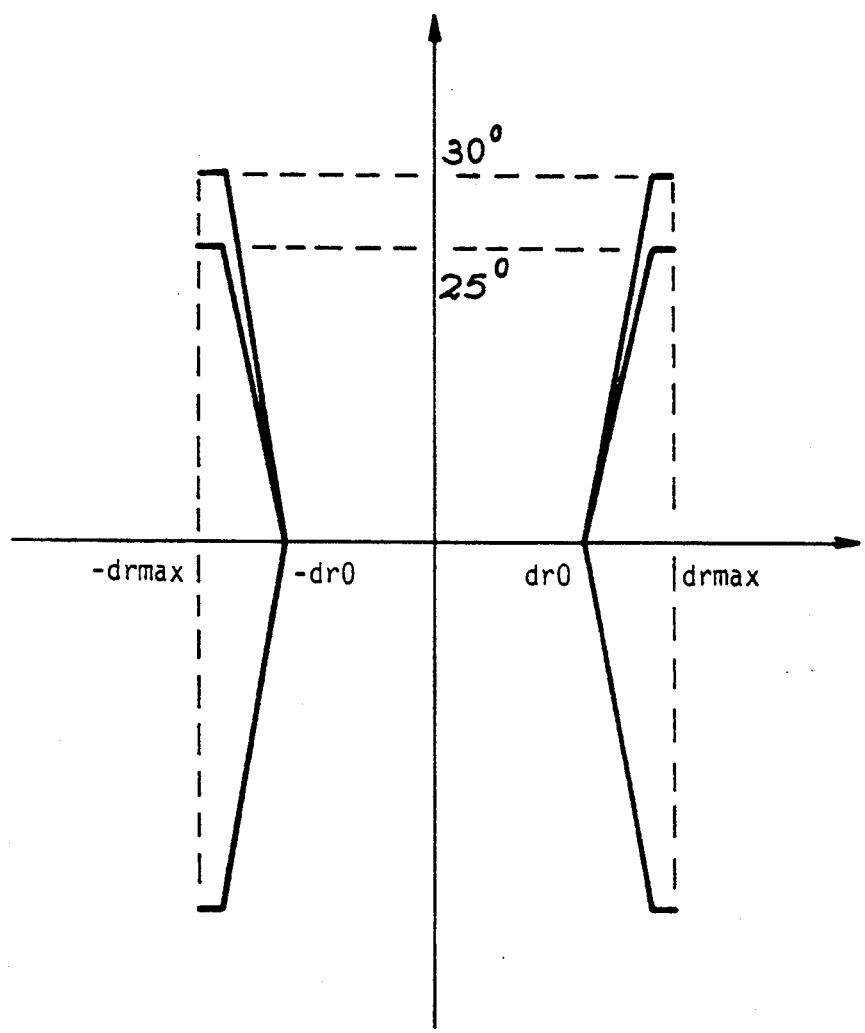
FIG. 3 is a graph giving the deflection of the wing surfaces as a function of the rudder deflection, in order to illustrate the process according to the invention in the case of an aircraft having a configuration like the Airbus A340.

In this case, when the process of the invention is activated, as soon as a deflection of the rudder beyond a threshold dr0 is detected, the deflection instructions to the ailerons and spoilers making it possible to increase the effectiveness of the rudder are calculated. FIG. 3 illustrates the values taken into account in this case. It is pointed out that it is also possible to calculate these instructions beyond a threshold on the rudder bar (instead of on the control surfaces).

On considering the following notations:

dr rudder deflection, dr0 rudder threshold, drmax max rudder deflection, with the following symbol convention:

the aileron deflection is positive when the trailing edge of the aileron is downwards, the control surface deflection is positive when the trailing edge of the rudder is to the left, in practice the following deflection instructions are obtained:

if $|dr|<dr0$, the deflection instruction to the ailerons and to the spoiler 6 given by the process according to the invention is zero, if $dr0<|dr|<drmax-5°$ approximately, the deflection instruction on the external aileron passes linearly from 0 (for $|dr|=dr0$) to approximately $-30°$ (for $|dr|=drmax-5°$ approximately), the deflection instruction on the internal aileron passes linearly from zero (for $|dr|=dr0$) to approximately $-30°$ (for $|dr|=drmax-5°$ approximately), the deflection instruction on the spoiler 6 passes linearly from 0 (for $|dr|=dr0$) to approximately 25° (for $|dr|=drmax-5°$ approximately), if $|dr|>d/max-5°$ approximately:

the deflection instruction on the external aileron is equal to approximately 30°, the deflection instruction on the internal aileron is equal to approximately $-30°$, the deflection instruction on the spoiler 6 is equal to approximately 25°.

These deflection instructions are applied to the right-hand wing if the rudder is deflected to the right ($dr<0$), and to the left-hand wing if the rudder is deflected to the left ($dr>0$).

In addition, each instruction supplied by the process according to the invention is subsequently added to the instructions calculated for inducing the roll movement, the priority being left to the latter. Thus, if on a wing surface the sum of the instructions supplied by the process according to the invention and the instruction calculated for the roll movement exceeds the maximum authorized deflection value, what exceeds the limit is subtracted from the equivalent wing surface of the other wing.

It is pointed out that although the process according to the invention has its main application in the case of large civil aircraft in the take-off phase, it is also applicable to other aircraft type, either in flight, or on take-off.

We claim:

1. Process for automatically controlling the control surfaces of an aircraft so as to compensate for lateral path deviation at low speed, with said aircraft having two main wings each of which includes several control surfaces with at least one aileron and one spoiler and said aircraft having a rudder for controlling yaw, comprising the steps of:

detecting rudder deflection and the direction of said deflection;

computing rudder deviation beyond a given deflection threshold;

calculating a drag supplement proportional to the deflection of the rudder beyond said deflection threshold; and controlling at least one of said control surfaces on one wing of said aircraft on the side of rudder in the direction of said deflection by an amount corresponding to said calculated drag supplement for developing a yaw torque as a supplement to the yaw under the control of said rudder.

2. Control process as in claim 1, wherein the deflection of at least one wing's aileron on the side of the deflected rudder is controlled.

3. Control process as in claim 2, wherein where each wing is equipped with two ailerons, a differential deflection of the ailerons of the wing on the side of the deflected rudder is controlled, one being deflected downwards and the other upwards.

4. Control process, as in claim 7, wherein on the wing on the side of the deflected rudder, at least one spoiler is deflected upwards by a quantity such that the roll torque created by all the deflected control surfaces is minimized.

5. Control process as in claim 2, wherein on the wing on the side of the deflected rudder, at least one spoiler is deflected upwards.

6. Control process as in claim 3, wherein on the wing on the side of the deflected rudder, at least one spoiler is deflected upwards.

* * * * *